United States Patent
Richardson et al.

(10) Patent No.: US 6,842,985 B2
(45) Date of Patent: *Jan. 18, 2005

(54) PIVOTAL PLANT PROTECTOR

(75) Inventors: Andrew Richardson, Gilesgate (GB); Michael Wilson, Crook (GB)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/996,350

(22) Filed: Nov. 28, 2001

(65) Prior Publication Data

US 2002/0116827 A1 Aug. 29, 2002

(30) Foreign Application Priority Data

Nov. 29, 2000 (GB) .............................................. 0029014
Dec. 14, 2000 (GB) .............................................. 0030456

(51) Int. Cl.⁷ ........................ A01D 34/416; B26B 29/00
(52) U.S. Cl. .......................................... 30/276; 30/286
(58) Field of Search ........................ 30/276, 286, 289, 30/293, 347, 371; 56/12.7, 295; 172/13, 14; D8/8

(56) References Cited

U.S. PATENT DOCUMENTS

| | | | |
|---|---|---|---|
| 4,658,506 A | * | 4/1987 | Nilsson ........................ 30/371 |
| 4,756,084 A | | 7/1988 | Morita |
| 4,872,265 A | | 10/1989 | Powell |
| 4,890,389 A | * | 1/1990 | Whitkop ....................... 30/276 |
| 5,010,720 A | | 4/1991 | Corsi |
| 5,048,187 A | | 9/1991 | Ryan |
| 5,060,383 A | | 10/1991 | Ratkiewich |
| 5,107,665 A | | 4/1992 | Wright |
| 5,524,349 A | * | 6/1996 | Dolin .......................... 30/276 |
| 5,940,973 A | | 8/1999 | Kitz |
| 5,996,234 A | | 12/1999 | Fowler et al. |
| 6,226,876 B1 | * | 5/2001 | Ezell ........................... 30/276 |
| 6,324,765 B1 | * | 12/2001 | Watkins, Sr. .................. 30/276 |
| D463,230 S | * | 9/2002 | Robson .......................... D8/8 |
| 6,655,034 B2 | * | 12/2003 | Richardson et al. ........... 30/276 |
| 6,665,942 B2 | * | 12/2003 | Richardson et al. ........... 30/276 |

FOREIGN PATENT DOCUMENTS

EP 0 893 050 A1 1/1999
NL 1006816 5/1999

OTHER PUBLICATIONS

PCT International Application WO 99/05899; publication date Feb. 1999.

* cited by examiner

Primary Examiner—Hwei-Siu Payer
(74) Attorney, Agent, or Firm—Harness, Dickey & Pierce, P.L.C.

(57) ABSTRACT

A string trimmer comprising an elongate shaft; a cutting head rotatably mounted on one end of the elongate shaft; at least one cutting member which extends from the cutting head and a barrier which is capable of being used by an operator to move vegetation away from a path swept out by the cutting member when it rotate characterized in that the barrier is pivotally mounted about a single pivot axis on the string trimmer and, when the cutting head is rotating in a flat position is capable of pivoting from a position above the path swept out by the cutting member to a position below the path swept out by the cutting member without passing through the path swept out by the cutting member.

25 Claims, 10 Drawing Sheets

PIVOTAL PLANT PROTECTOR

The present invention relates to a string trimmer and in particular to a mechanism for shielding plants from the cutting path swept out by the rotating cutting line of the string trimmer.

BACKGROUND OF INVENTION

String trimmers are portable hand-held outdoor gardening power tools, used for domestic and commercial grass cutting and are powered by electrical motors or small combustion engines. A string trimmer has a cutting head from which extends a cutting line, the cutting line commonly being a flexible plastic wire. The cutting line extends radially from the axis of rotation of the cutting head when it is rotatably driven by a motor. In the usual cutting mode, the cutting head and cutting line rotate a high rotational speed about an approximately vertical axis. The rotating cutting line is placed in close proximity to the grass to be cut. The grass caught within the path swept out by the rotating cutting line is severed when impacted by the cutting line.

This method of cutting grass is quick and highly effective and can be employed in dense grass or on a household lawn.

Indiscriminate cutting of soft vegetation may not be a problem when cutting in certain locations. However, the string trimmer may be used in a location where there is a mixture of soft vegetation where some parts need to be cut and other parts need to be left. One example is where the verge of a lawn abuts a flower bed containing small and delicate flowers which overhang the grass. In this example a string trimmer cannot be used easily to cut the grass without damaging overhanging flowers that are also caught in the path swept out by the rotating cutting line.

The example cited above illustrates a situation when the user wishes to protect certain plants from the rotating cutting line. There are, however, instances when the user wishes to protect the rotating cutting line from coming into contact with hard objects that the cutting line was not intended to cut, such as rocks or stones. When the rotating cutting line makes contact with such objects, it is liable to be damaged and therefore would need to be replaced. This situation is also undesirable and a device which protects certain plants from the rotating cutting line should also be capable of protecting the rotating cutting line from damaging itself against hard objects.

Prior art document EP 0 893 050 discloses a length of rigid metal wire attached to and extending outwardly from the motor housing of a string trimmer and is adapted to form a guard surrounding part of the path swept out by the rotating cutting line. EP 0 893 050 further discloses that the wire can also act as an edging guide. When acting as an edging guide, the rotating cutting line can cut a uniform edge along a lawn edge or a curb without coming into contact with the lawn edge or curb.

However, there are two problems associated with the guard disclosed in EP 0 893 050. The metal wire, when acting as a guard, does not surround the path swept out by the rotating cutting line. This leaves ample space for vegetation, such as overhanging plants or flowers, to enter into the path swept out by the rotating cutting line which results in damage to this vegetation.

Secondly, when the string trimmer is used in edging mode, the metal wire acts as a guide and therefore is unable to act as a guard. As such no protection is provided against cutting vegetation which is not intended to be cut.

SUMMARY OF THE INVENTION

According to the first aspect of the present invention there is provided a string trimmer comprising an elongate shaft; a cutting head rotatably mounted on one end of the elongate shaft at least one cutting member which extends from the cutting head and a barrier which is capable of being used by an operator to move vegetation away from a path swept out by the cutting member when it rotates characterised in that the barrier is pivotally mounted about a single axis on the string trimmer and, when the cutting head is rotating in a flat cutting position, is capable of pivoting from a position above the path swept out by the cutting member to a position below the path swept out by the cutting member without passing through the path swept out by the cutting member.

The string trimmer according to the present invention can provide a lightweight plant protector which can be pivotally moved between a plurality of positions without the need of dismantling any part of the string trimmer. When in use, a primary function of the plant protector is to provide a barrier between overhanging plants and the path swept out by the rotating cutting line, while still allowing low level vegetation like for example grass, to pass below the lower edge of the plant protector and into the path of the rotating cutting line. A plant protector according to the present invention can have two 'in-use' positions; one position for flat cutting and, the other for vertical edge trimming, such that when located in both 'in-use' positions the lower edge of the plant protector is approximately horizontal when the string trimmer is used in the appropriate way. This is achieved by pivotally mounting the barrier onto the string trimmer. This plant protector provides a barrier which pushes away any overhanging plants from the path of the cutting member as the string trimmer advances towards them. While protecting overhanging plants from the rotating cutting line, the plant protector also protects the rotating cutting line from unnecessary contact with hard objects, like for example stone, which can damage and shorten the life span of the cutting line.

However, the user may wish to "shoe" the plant protector on the string trimmer putting it out of use whilst maintain it attached to the string trimmer by pivoting the plant protector to an 'out-of-use' position. As the plant protector remains pivotally attached to the string trimmer is ready for immediate use by an operator to shield plants from the path swept out by the cutting member.

Ideally, the axis of pivot is perpendicular to the axis of rotation of the cutting head both when it is located in a flat cutting position or a vertical edging position.

The barrier may be capable of pivoting through at least 270° and also from a first position where it is located on one side of the elongate shaft to a second position where it is located on the other side of the elongate shaft. By constructing the barrier in this manner, it pivots through the whole range positions excluding that occupied by the shaft of the string trimmer.

The string trimmer can have suitable dimensions so that it is capable of surrounding the edge of the path swept out by the cutting member when it rotates irrespective whether the cutting head is in a flat cutting position or a vertical edging position.

The barrier can be capable of pivoting to a position wherein it projects forward, downward or rearward of the string trimmer.

Ideally the string trimmer comprises a guard, the barrier being capable of pivoting to a position where it surrounds the rear of the guard. Preferably the barrier is pivotally mounted on the guard.

Alternatively, the barrier being capable of pivoting to a position where the guard surrounds at least part or all of the barrier.

The barrier can be pivotally mounted on the string trimmer at each end of its ends by pivot mechanisms.

The barrier can be in the form of a band which is pivotally mounted at each of its ends and can curve from one pivot point around to the other pivot point.

According to a second aspect of the present invention, there is provided a barrier for use on a string trimmer comprising an elongate shaft; a cutting head rotatably mounted on one end of the elongate shaft; at least one cutting member which extends from the cutting head the barrier being capable of being used by an operator to move vegetation away from a path swept out by the cutting member when it rotates characterised in that the barrier is capable of being pivotally mounted on a string trimmer about a single axis in a manner where it can pivot from a first position above a path swept out by a cutting member to a second position below a path swept out by a cutting member without passing through the path swept out by a cutting member, when the cutting head is rotated in a flat cutting position.

BRIEF DESCRIPTION OF THE DRAWINGS

Three embodiments of the present invention will now be described, with reference to the following drawings, of which.

DETAILED DESCRIPTION OF PREFERRED EMBODIMENTS

FIGS. 1 to 9 show the first embodiment of the invention and which will now be described.

Figure 1:
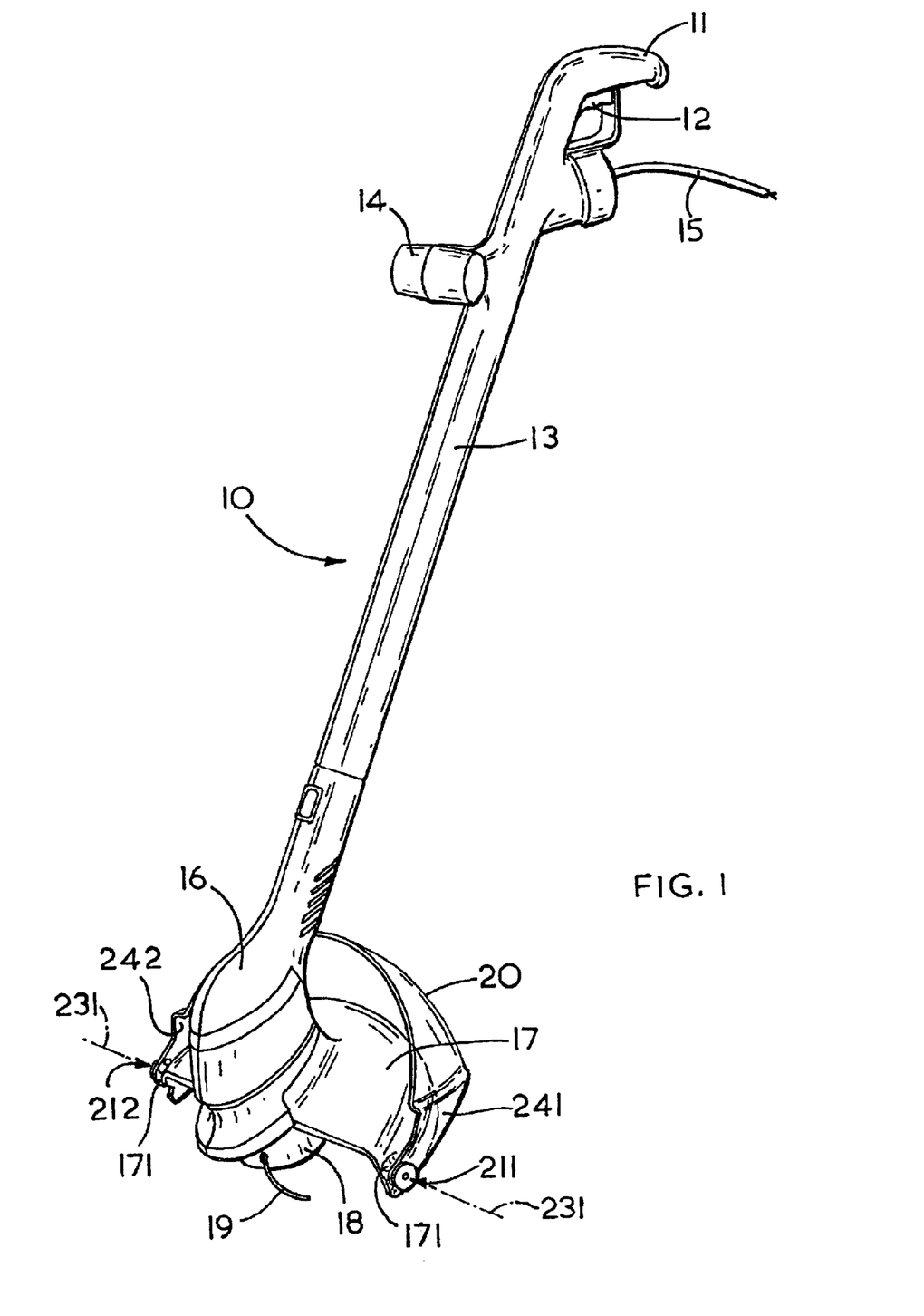
FIG. 1 shows a perspective view of a string trimmer with the plant protector in a storage position in accordance with the first embodiment.

Referring to FIG. 1 It a string trimmer 10 comprises an elongate shaft 13, a rear handle 11 attached to one end of the elongate shaft 13, an electrical trigger switch 12 located below the rear handle 11, a front support handle 14 attached part way along the elongate shaft 13, an electrical cable 15 capable of carrying electrical current and entering the elongate shaft 13 at a location below the rear handle 11, a motor housing 16 attached to the other end of the elongate shaft 13 in which is mounted an electric motor (not shown), a semi-circular protection guard 17 attached to the motor housing 16 having a semi-circular edge 176, a cutting head 18 rotatingly driven by the electric motor, a cutting line 19 which extends from the cutting head 18, and a plant protector 20 pivotally attached to the protection guard 17 at two pivot points 211;212 in symmetrical fashion.

When operating the string trimmer 10 the user stands in an upright position, holding the weight of the string trimmer 10 by the rear handle 11 and directing the cutting head with the front support handle 14, the elongate shaft 13 extending downwardly from the rear handle 11 towards the motor housing 16 and the ground. The cutting head 18 is located in close proximity to, but clear of, the ground and is rotatingly driven by the electric motor when the electric motor is energised by the user. Electrical current supplied by the electrical cable 15 is supplied to the electric motor via the electrical switch 12, the electrical switch 12 connecting or disconnecting the electrical supply to the electric motor when operated by the user. When connected to the electrical current supply the electric motor is energised and rotatingly drives the cutting head 18 and the cutting line 19. Conversely, disconnection of the electrical current supply de-energises the electric motor which results in the rotation of the cutting head 18 and cutting line 19 ceasing. The cutting line 19 is a strong elongate filament, like for example, plastic wire, which extends radially from the cutting head 18. When the cutting head 18 is rotatingly driven by the electric motor, the cutting line 19 turns with the cutting head 18 about the same axis and sweep at a circular path cutting any soft vegetation, for example grass, which enters the path swept out by the rotating cutting line 19.

The protection guard 17 is part circular in shape and is adapted to surround part of the path swept out by the line on the side of the string trimmer 10 where the user normally stands during operation. By surrounding the cutting path the protection guard 17 prevents the user from accidentally placing their foot within the path of the rotating cutting line 19. The part of the path swept out by the cutting line on the other side of the motor housing 16 is exposed so that any grass or soft vegetation falling within the path will be cut.

Figure 2:
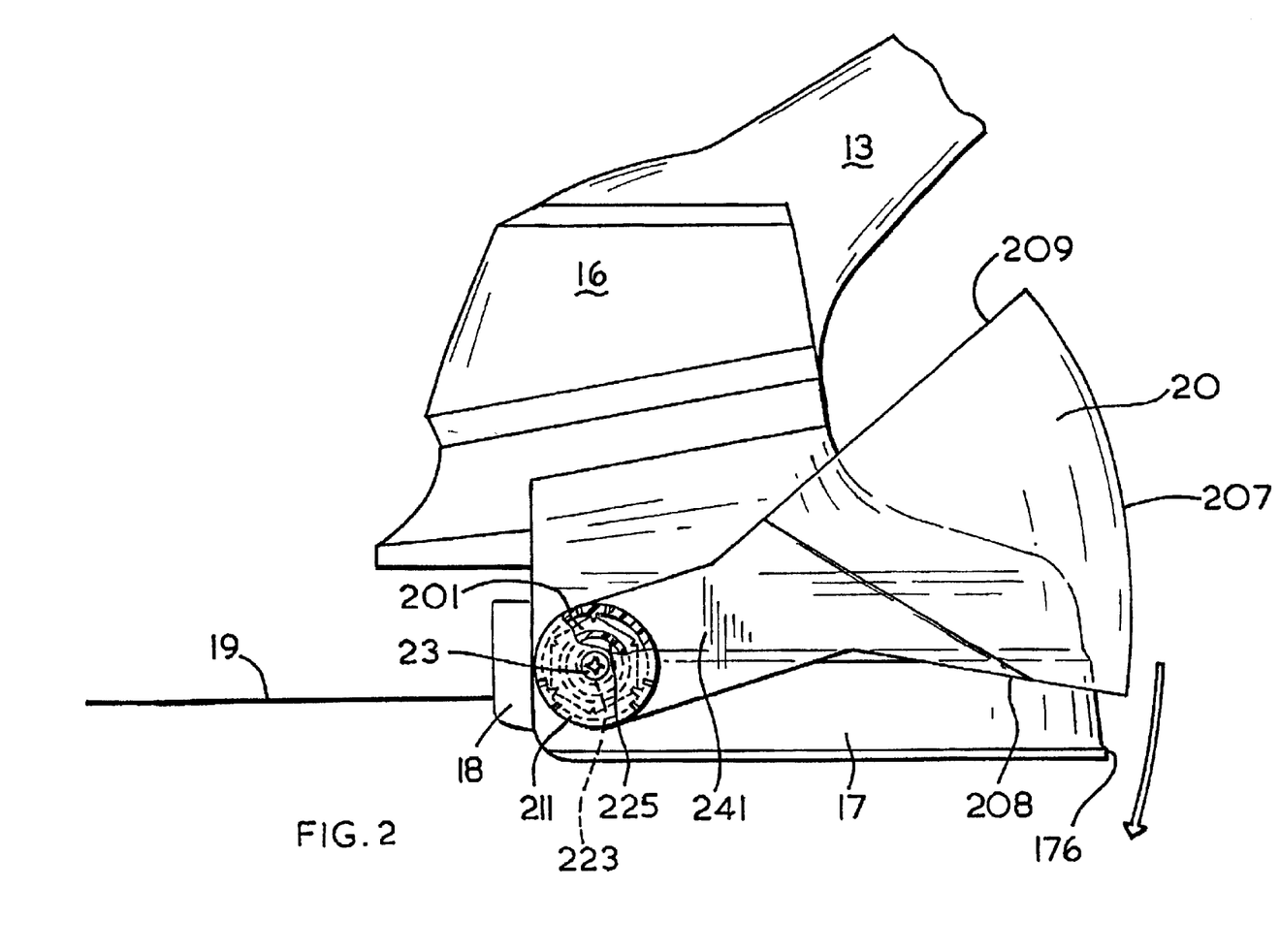
FIG. 2 shows a side view of the motor housing and guard of the string trimmer in cutting mode with the plant protector in a storage position.
Figure 4:
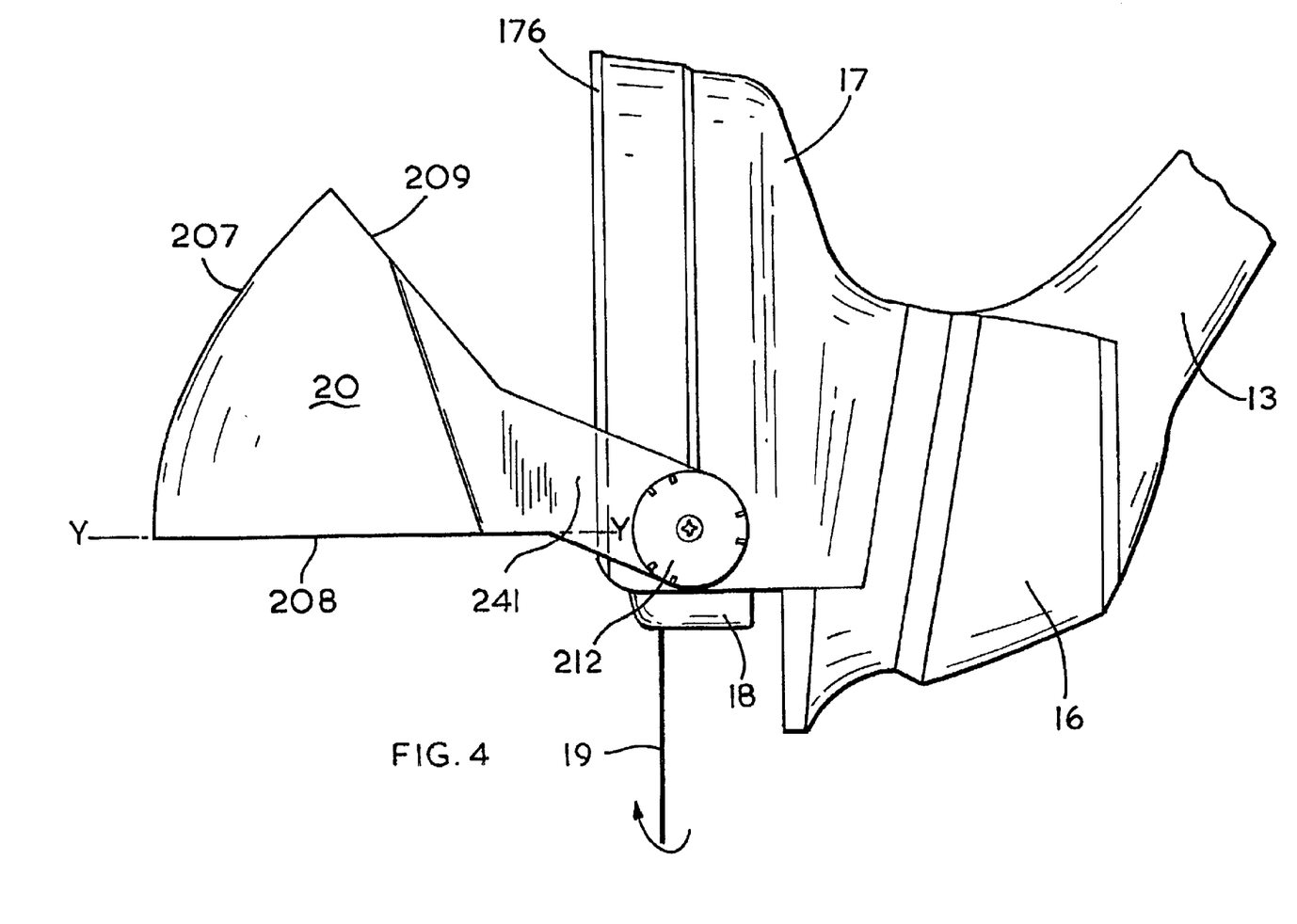
FIG. 4 shows a side view of the motor housing and guard of the string trimmer in edging mode with the plant protector in the "vertical edge cutting" position.

The plant protector 20 is mounted so that it pivots about an axis which perpendicular to the axis of rotation of the cutting head 18 when it is in its flat cutting position as shown in FIG. 2 and also when it is in its vertical edge cutting position as shown in FIG. 4.

The plant protector 20 is able to be pivoted from the first position (not shown) where it is adjacent the elongate shaft 13 located just forward of the elongate shaft 13 through an angle of over 270° first to a position forward of the string trimmer (see FIG. 3) to a position below the string trimmer not shown, to a position rearward of the string trimmer (see FIG. 2) and to a second position adjacent the elongate shaft 13, however, now being located just to the rear of the elongate shaft 13 (not shown).

Referring to FIG. 2, the plant protector 20 is made of transparent plastics material and comprises, a body 207, a first elongate side member 241, and a second symmetrical elongate side member 242. The first side member 241 is located on one side of the body 207 and extends from the body 207 to the first pivot point 211. The second side member 242 is located on the other side of the body 207 and extends from the body 207 to the second pivot point 212 in symmetrical fashion to the first side member 241.

Figure 6:
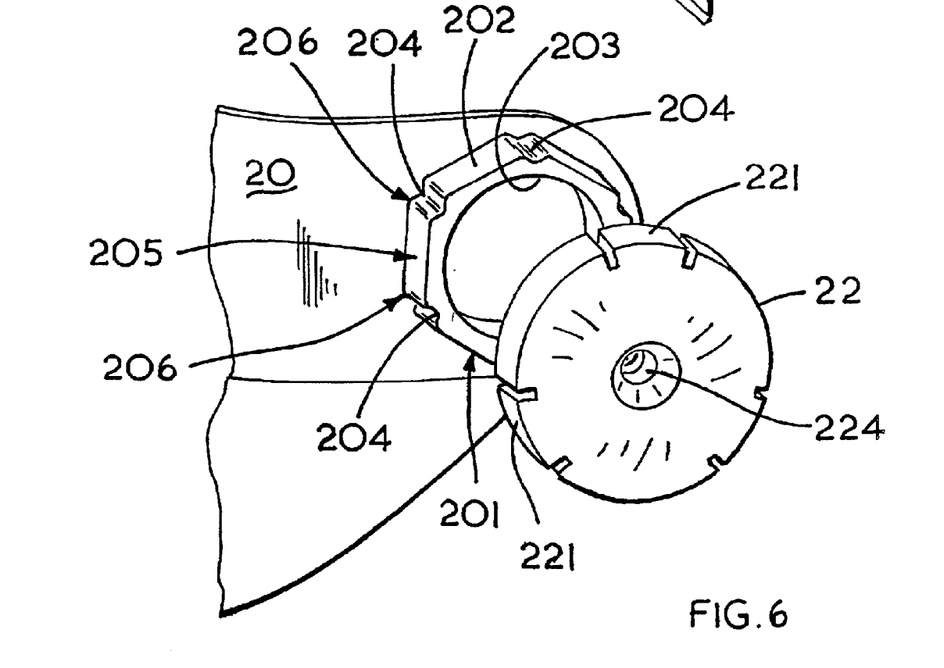
FIG. 6 shows an exploded view of the cap and part of the plant protector from the other side to that shown in FIG. 5.
Figure 7:
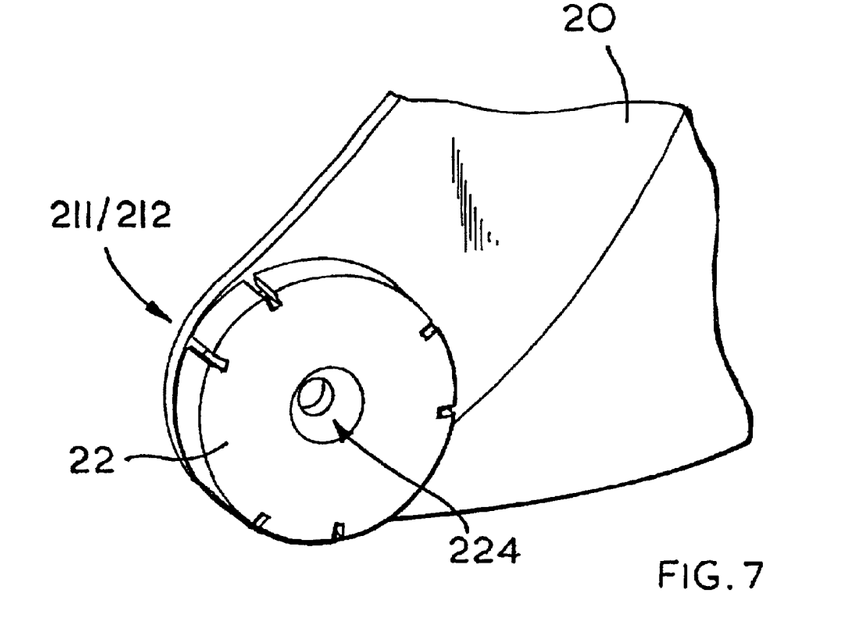
FIG. 7 shows a view of the cap and part of the plant protector when assembled from the same side as that shown in FIG. 6.
Figure 8:
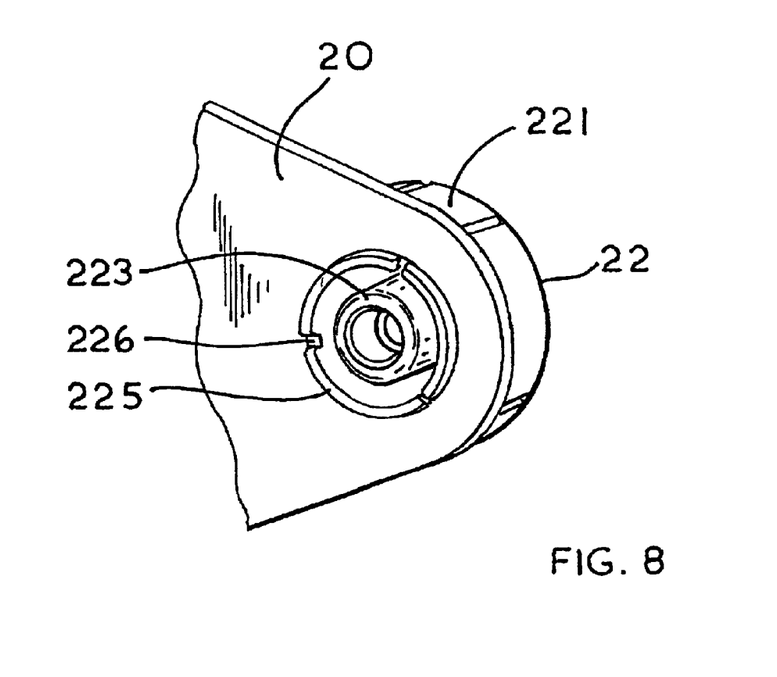
FIG. 8 shows a view of the cap and part of the plant protector when assembled from the other side as that shown in FIG. 7.

The first 241 and second 242 side members each have a hexagonal collar 201 located at the end of the side member away from the body 207 as shown in FIG. 6. The hexagonal collar 201 of the first 241 and second 242 side members form part of the first 211 and second 212 pivot points respectively. The body 207 is similar in shape to a motor cycle crash helmet visor. The body 207 has a first edge 208, and a second edge 209, each edge describing an arc. The radius of the spherical section of the body 207 is sufficiently greater than the outer radius of the protection guard 17 so that the plant protector 20 can rotate about the pivot points 211; 212 through its full range of pivotal movement without making contact with the protection guard 17 as best shown in FIG. 2. The first 211 and second 212 pivot points act together as both pivotal support and latch mechanism for the plant protector 20. The pivot points 211; 212 are capable of releasably latching the plant protector 20 in up to six different pre-determined pivotal stationary positions, or allowing rotational movement of the plant protector 20 in relation to the guard 17 when urged by the user. In particular, the pivot points 211; 212 are formed so that three of the six stationary positions can hold the plant protector in either a 'storage' (FIG. 2), a 'trimming' (FIG. 3) or an 'edge cutting' (FIG. 4) position.

Figure 3:
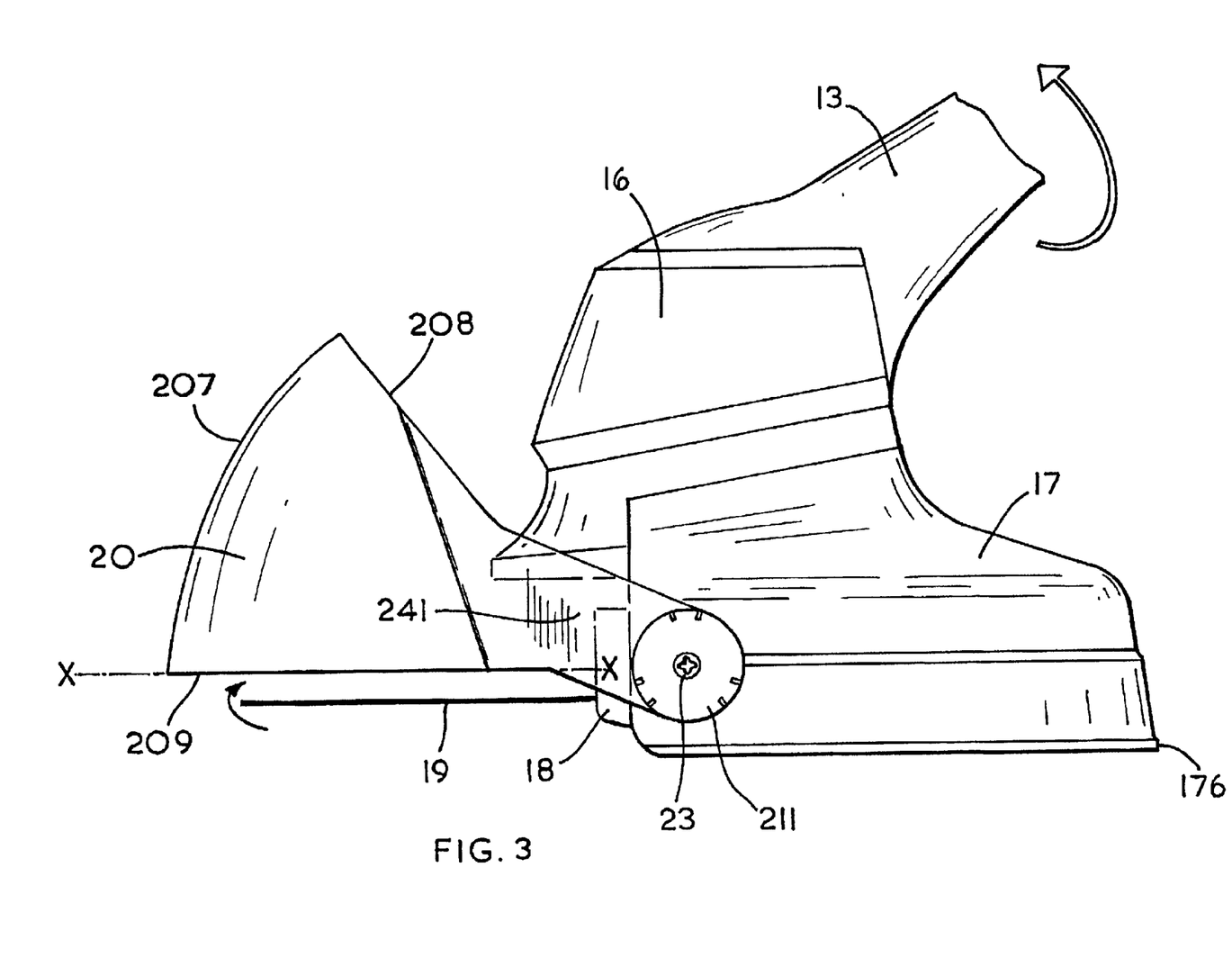
FIG. 3 shows a side view of the motor housing and guard of the string trimmer in cutting mode with the plant protector in the "flat cutting" position.

There now follows a description, with reference to FIGS. 2 to 4, of the plant protector 20 located in these three stationary positions.

FIG. 2 shows the plant protector 20 in the "storage" position. The body 207 of the plant protector 20 is located behind the guard 17. In the storage position the plant protector 20 surrounds part of the rear outer surface of the protection guard 17, the protection guard 17 surrounding approximately half the circular path swept out by the rotating cutting line 19. The plant protector 20 is not in use when located in the storage position.

FIG. 3 shows the plant protector 20 in the "trimming" position where the plant protector projects forward of the string trimmer. The body 207 of the plant protector 20 is located at the front of the motor housing 16 and projects forward. The second edge 209, as viewed from the side in FIG. 3, is located in a plane X—X, the plane X—X being substantially parallel to the ground and being the closest part of the plant protector 20 to the rotating cutting line 19. The path swept out by the rotating cutting line 19 is also parallel to the ground and is located just beneath the plant protector 20. The rotating cutting line 19 is located closer to the ground than the edge 209 in order to cut low-level vegetation like, for example, grass while other overhanging plants are pushed away by the body 207 of the plant protector 20 and therefore protected from the rotating cutting line 19.

FIG. 4 shows the plant protector 20 in the "edge cutting" position the plant protector is still projecting forward of the string trimmer. The cutting head 18 of the string trimmer 10 is orientated so that the path swept out by the rotating cutting line 19 is vertical. When the path swept out by the rotating cutting line 19 is vertical, the string trimmer can be used to cut grass overhanging the vertical edge of a grass lawn adjoining a flower bed. The motor housing 16 is located on the grass lawn side of the path swept out by the rotating cutting line 19, and the plant protector 20 is located on the opposite side of the path swept above the flower bed. The first edge 208, as viewed from the side in FIG. 4, is located within a plane Y—Y, the plane Y—Y being parallel to the ground and being perpendicular to the path swept out by the rotating cutting line 19. In the "edge cutting" position the plant protector 17 acts as a shield surrounding part of the upper half of the path swept out by the rotating cutting line 19 thereby protecting those plants and flowers rooted in the flower bed and overhanging the vertical edge of the lawn from the rotating cutting line 19.

The first 211 and second 212 pivot points are located on opposite sides of the guard 17 and are constructed in the same manner. A description of the construction of the plant protector of the first pivot point 211 is equally applicable to the construction of the second pivot point 212. The construction of the first pivot point 211 will now be described with reference to FIGS. 5 to 9.

Figure 9:
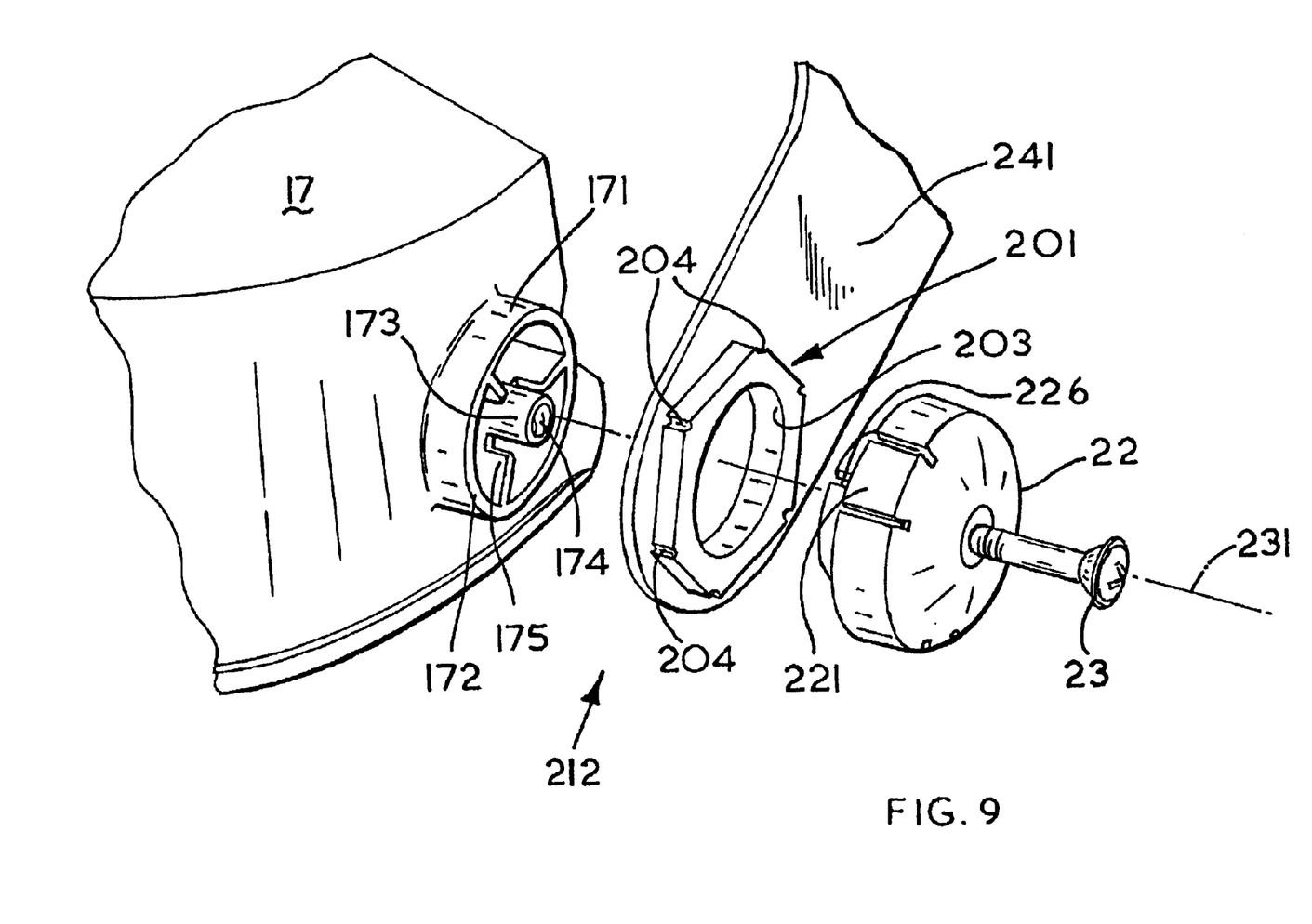
FIG. 9 shows an exploded view of cap and guard.

The pivot point 211 comprises:

a) a raised section 171 moulded into the protection guard 17, the raised section 171 comprising an outer circular ridge 172, a central hub 173 having a threaded aperture 174, and three shoulders 175 extending radially in from the circular ridge 172 to the central hub 173 (see FIG. 9);

b) a hexagonal collar 201 moulded into the plant protector 20 having a circular internal aperture 203, the hexagonal collar 201 having six outer flats 202 inter-posed by six 'v'-shaped troughs 204, the flats 202 each comprising a mid-point 205 and two extreme-ends 206, an extreme-end 206 being formed at the transitional point between a flat 202 and its adjacent trough 204 (see FIG. 6);

c) a circular cap 22 made of resilient material, comprising a perimeter wall 227 and three tongues 221, wherein the three tongues 221 form part of the perimeter wall 227, each of which is capable of resilient deformation and each one has a protrusion 222. The circular cap 22 further comprises a central collar 223 forming an aperture 224 and an annular raised portion 225 located in the annular space between the collar 223 and the perimeter wall 227. The annular raised portion 225 has three grooves 226 on its outer surface. Each of the three grooves 226 is adapted to simultaneously receive one of the three shoulders 175 when the pivot point 211 is assembled (see FIG. 5);

d) a threaded bolt 23 forming the axis of rotation 231 of the pivot point 211.

Figure 5:
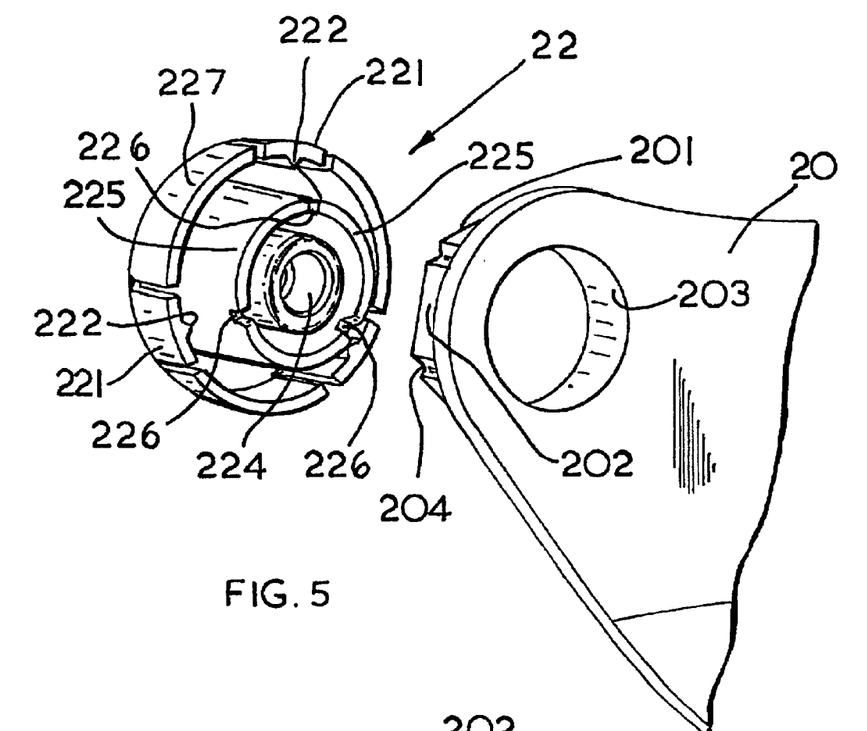
FIG. 5 shows an exploded view of the cap and part of the plant protector from one side.

Assembly of the pivot point 211 is a three stage process:

Firstly unite the cap 22 and the plant protector 20 so that the raised portion 225 of the cap 22 is received by the aperture 203 on the plant protector 20 (as shown by FIG. 5) and the hexagonal collar 201 is received by the annular trough located between the annular raised portion 225 and the perimeter wall 227 of the cap 22 (as shown in FIGS. 5 and 6), such that each protrusion 222 makes contact with the mid-point 205 of one of the flats 202 without resilient deformation of the tongue 221.

Secondly, unite both the cap 22 and the plant protector 20 with the guard 17 so that the hub 173 of the guard 17 is received by the aperture 224 of the cap and the raised portion 225 engages with the three shoulders 175, such that each shoulder 175 is received by one of the three grooves 226 in the raised portion 225 thereby preventing rotational movement of the cap 22 relative to the plant protector 20.

Thirdly, securely fix the cap 22 to the guard 17 with the bolt 23 which engages with threaded aperture 174 of the guard 17.

The pivot points 211;212, once assembled, allow rotational movement of the plant protector 20 relative to the guard 17 and the cap 22, subject to interaction between the protrusions 222 on the tongues 221 and the troughs 204. The six flats 202 and six troughs 204 of the hexagonal collar 201 form part of, and move with, the plant protector 20. Each flat 202 is arranged so that the distance between its mid-point 205 and the axis of rotation 231 is smaller than the distance between one of its extreme ends 206 and the axis of rotation 231. When a protrusion 222 makes contact at the mid-point 205 of an adjacent flat 202 the tongue 221 on which is mounted that protrusion is not deformed. However, should a protrusion 222 slide towards an extreme end 206 of that same flat 202, due to rotation of the plant protector 20 relative to the guard 17 and the cap 22, then the protrusion 222 is pushed radially outwards and away from the axis of rotation 231 due to contact with the flat 202 and, resiliently deforms its tongue 221. The resilient nature of the tongue 221 resists the sliding of the protrusion 222 from the mid-point 205 to the extreme-end 206.

Moving the protrusion 222 further from the mid-point 205 and beyond the extreme-end 206 engages the protrusion 222 with a 'v'-shaped trough 204. The distance between the bottom of the trough 204 and the axis of rotation 231 is smaller than the distance between the extreme-end 206 and the axis of rotation 231, therefore the deformation of the tongue 221 is reduced once the protrusion 222 passes the extreme-end 206 and engages with the trough 204. Once the protrusion 222 is engaged with the trough 204 the resilient nature of its tongue 221 resists movement of the protrusion 222 from the trough 204.

The protrusions 222, the flats 202 and the troughs 204 are all mutually aligned so that if one protrusion 222 is engaged with a trough 204 then each of the other two protrusions 222 are simultaneously engaged with the other troughs 204. Equally, if one protrusion 222 is located at the mid-point 205 of a flat 202 then each of the other protrusions 222 is simultaneously located at the mid-point 205 of a flat 202, and so on. The first 211 and second 212 pivot points resist relative rotational movement between the guard 17 and the plant protector 20 because this involves the protrusions 222 moving from one trough 204 to engage with another trough 204.

This acts as a latch mechanism, only allowing rotational movement of the protrusions 222 between two troughs 204 when a sufficient rotational force exerted by the user is great enough to overcome the resilient force of the tongues 221. Conversely, the effect of gravity upon the mass of the plant protector 20 does not exert a great enough rotational force about the axis of rotation 231 to overcome the resilient force of the tongues 221 and cause rotational movement of the protrusions 222 between two troughs 204. Therefore the first 211 and second 212 pivot points hold the plant protector 20 stationary in relation to the protection guard 17 in any one of six positions provided each protrusion 222 is engaged with a trough 204. These six positions are predetermined by the orientation of six troughs 204 relative to the plant protector 20.

During its life, a string trimmer risks being stored for a long time with the plant protector 20 positioned relative to the protection guard 17 in such a way that the protrusions 222 are not engaged with a trough 204. In such a case, each protrusion 222 must instead be located somewhere upon the surface of an adjacent flat 202. This location may be the extreme end 206 of the flat 202 causing continual deformation of the tongue 221. Over time, continual deformation of the resilient material forming the tongues 221 may result in plastic deformation of the tongues 221. Once plastically deformed, the tongues 221 loose their resilience and are unable to fully engage their protrusions 222 with the troughs 204. Once this has happened, the holding force of first 211 and second 212 pivot points is reduced. In cases of extreme deformation the effect of gravity upon the mass of the plant protector 20 can be sufficient to exert a great enough rotational force about the axis of rotation 231 to overcome the what remains of resilient force of the tongues 221.

In this embodiment such a risk is reduced due to the inclusion of the flats 202 between the troughs 204. If each protrusion 222 is located at one extreme end 206 of the flat 202 then the protrusion 222 and hence the tongue tends to slide along the surface from the extreme end 206 to the mid-point 202 reducing distance between the axis of rotation 231 and protrusion. The tongue 221 is resiliently deformed when its protrusion 222 is located at one extreme end, is located either at the mid-point 202 or is engaged with one of the trough 204. If a string trimmer is stored with each protrusion 222 located at one extreme end 206 then, the resilient nature of the tongue 221 urges its protrusion 222 to slide towards the mid-point 205 of the same flat 202 where the tongue 221 is no longer deformed. The use of flats 202 between trough 204 provides a means of reducing the likelihood that the tongues 221 do not become plastically deformed. Therefore, the performance of the latching mechanism is less likely to deteriorate over time.

Though FIG. 3 shows the plant protector 20 located above the cutting line 19, the plant protector can be pivoted downwardly so that it surrounds the front half of the path swept out by the cutting line. When in this position, the protrusions 222 are engaged with the flats 202.

The second embodiment of the present invention will now be described with reference to FIGS. 10 and 11.

The same reference numbers have been used to describe the second embodiment as the first embodiment except where the design has been changed.

Figure 11:
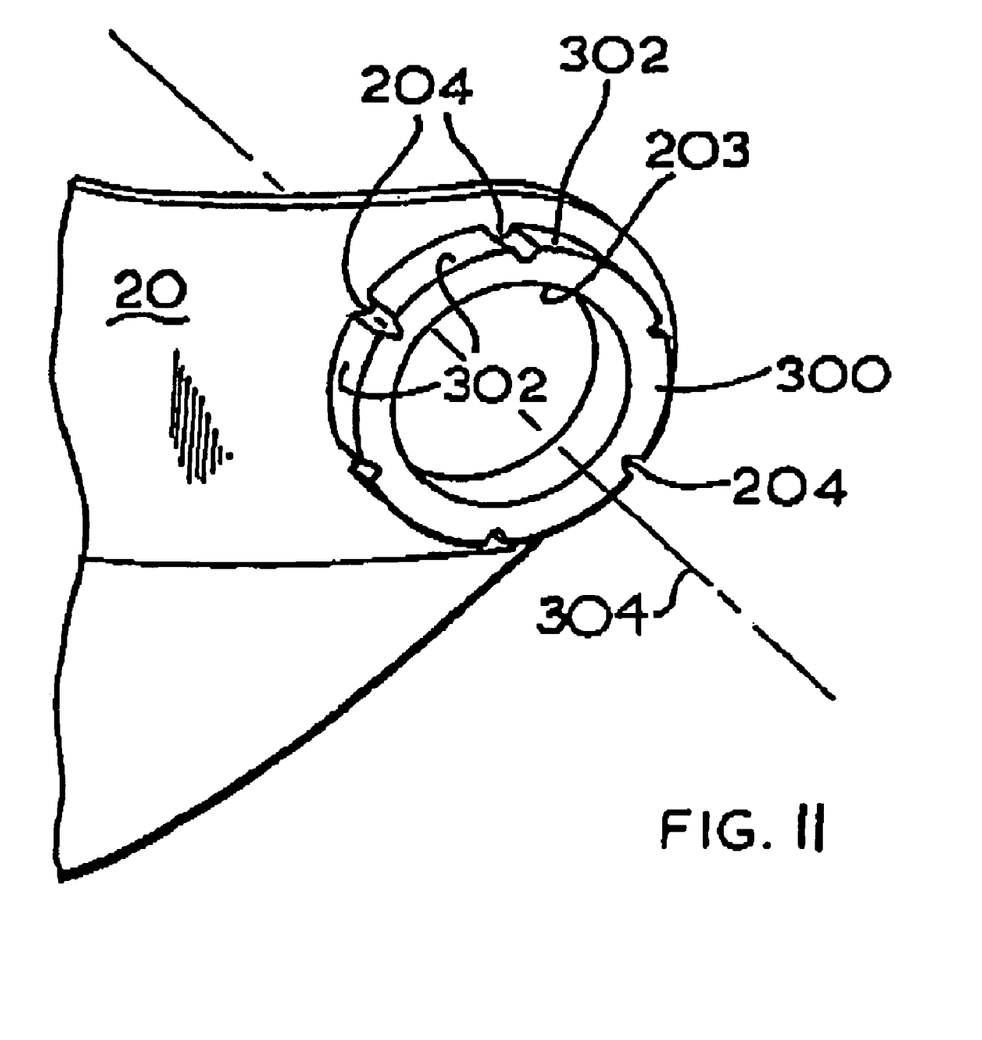
FIG. 11 shows a view of part of the plant protector showing the circular collar.

The design of the second embodiment of the present invention is the same as that of the first embodiment except that the hexagonal collar 201 on the plant protector of the first embodiment of the invention has been replaced by a circular collar 300 as shown in FIG. 11. The circular collar 300 comprises six flats 302 which are curved, each flat 302 having a radius of curvature about the axis 304 which passes through the centre of the collar 300 and which is the same as the other flats 302. Between each pair of flats 302 is located a trough 204, there being six troughs in total.

The second embodiment of the present invention works in the same manner as the first embodiment. When the protrusion 222 on the tongue 221 of the cap 22 is rotated from a position where it is engaged with a trough 204 to a position where it engages with a flat 302, the tongue resiliently deforms outwardly. However as the protrusion continues to rotate relative to the circular collar 300 it slides along the surface of the flat 302 of the circular collar 300, the amount of deformation of the tongue 221 remains constant as it slides along the flat 302 until it reaches the next trough where it engages with the trough to latch the pivot mechanism and hence the plant protector into a latched position.

Figure 10:
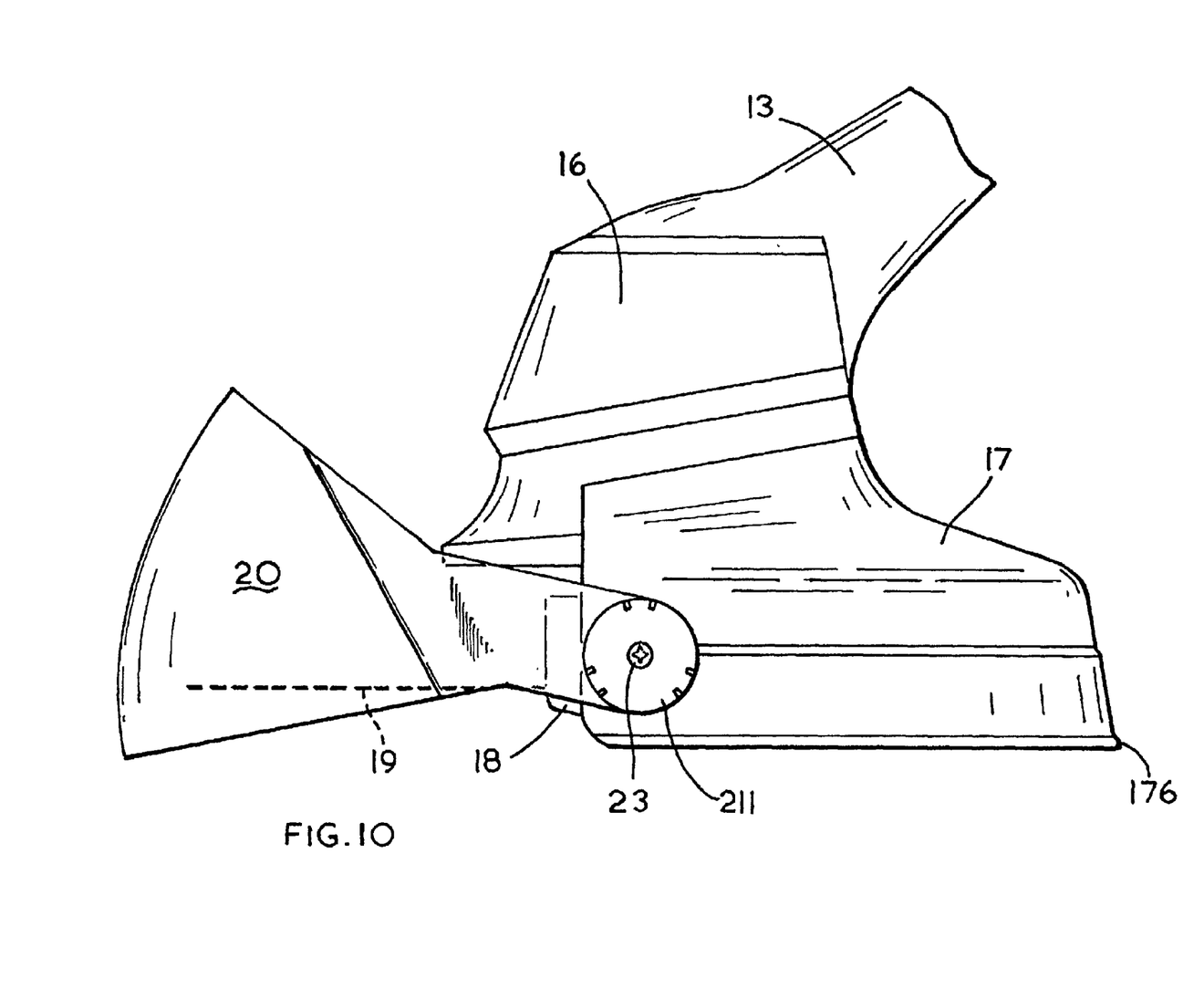
FIG. 10 shows a side view of the motor housing and guard of the string trimmer in a cutting mode with the plant protector in a position where it surrounds the edge of the path swept out by cutting line in accordance with the second embodiment of the invention.

The orientation of the troughs 204 about the axis 304 has been varied in the second embodiment to that of the first so that when the plant protector is in a forward projecting position in front of the cutting head 18 and the protrusions 222 are engaged with the troughs 204, it surrounds the front edge of the path swept out by the cutting line 19 when it rotates as shown in FIG. 10.

The design of the third embodiment of the present invention will be described with reference to FIG. 12 and is the same as that of the first except for the fact that the plant protector is mounted at its pivot points on the inside of the wall of the protector guard 17. Except for the plant protector 400 the same reference numbers have been used in FIG. 12 as those used to describe the first embodiment. The guard is part circular in shape and is adapted to surround part of the rear of the path swept out by the rotating cutting line. The pivot points not shown are constructed in the same manner as those described in the first embodiment, the raised sector being moulded into the guard facing inwardly towards the cutting head 18, the hexagonal collar on the plant protector and the cap being located within the space surrounded by the guard.

The radius of the plant protector 400 is less than that of the wall of the guard but greater than that of the path swept out by the rotating cutting line.

The plant protector pivots in the same manner as that of the first embodiment.

Figure 12:
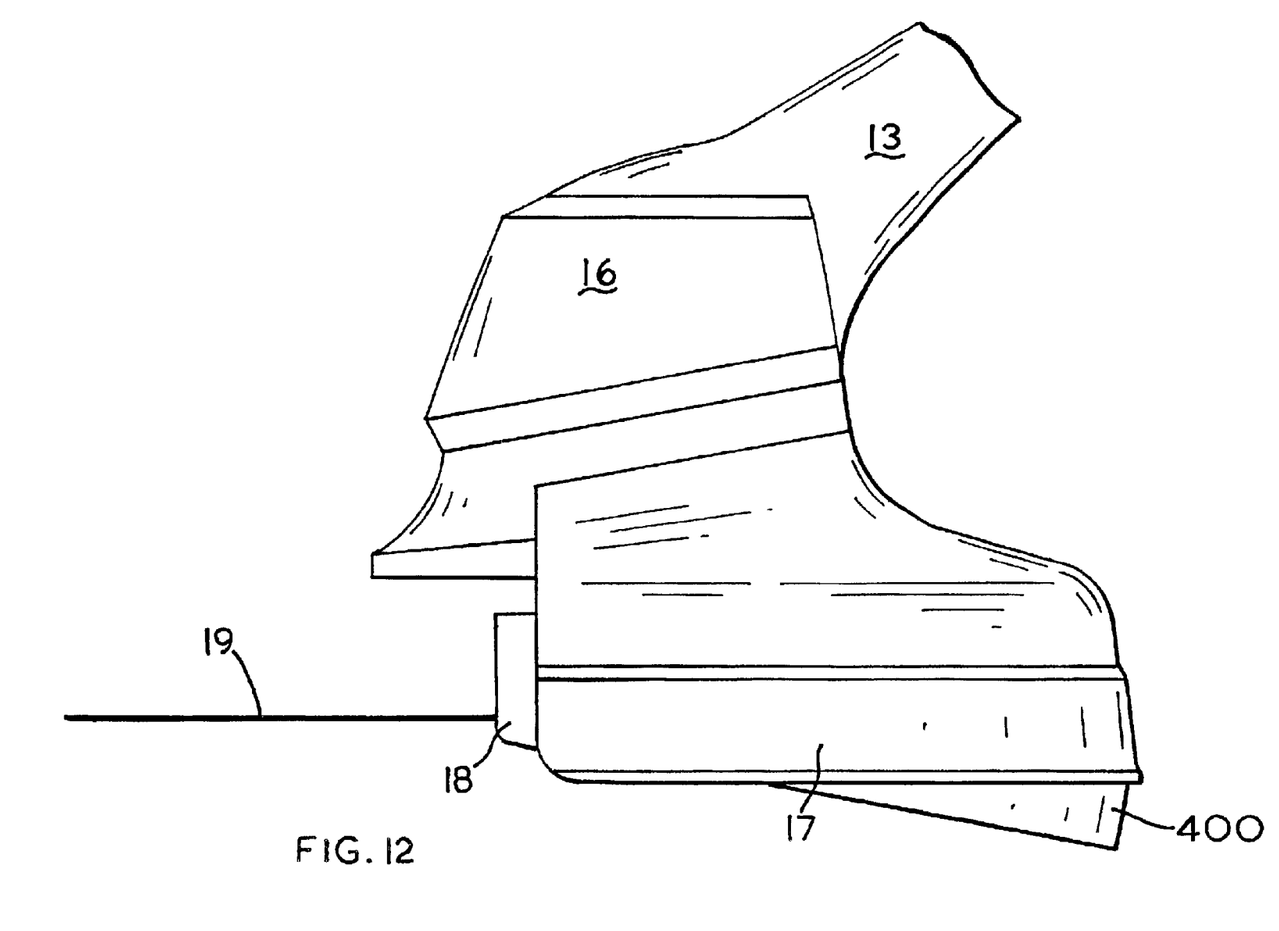
FIG. 12 shows a side view of the motor housing and guard of a string trimmer in cutting mode with the plant protector in the storage position according to the third embodiment of the present invention.

However, when the plant protector is pivoted to the "storage position" the top part of the plant protector locates to a position within the protection guard as shown in FIG. 12 but surrounding the path swept out by the rotating cutting line.

It will be obvious to a person skilled in the art to reduce the width of the plant protector sufficient so that it is entirely located within the space surrounded by the guard when located in the "storage position".

What is claimed is:

1. A string trimmer comprising:
   an elongate shaft;
   a cutting head rotatably mounted on one end of the elongate shaft;
   at least one cutting member which extends from the cutting head;
   a barrier which is capable of being used by an operator to move vegetation away from a path swept out by the cutting member when it rotates, characterized in that the barrier is pivotally mounted about a single pivot axis on the string trimmer and, when the cutting head is rotating in a flat position, is capable of pivoting from a position above the path swept out by the cutting member to a position below the path swept out by the cutting member without passing through the path swept out by the cutting member, and is able to pivot from a first position where it is located on one side of the elongate shaft to a second position where it is located on the other side of the elongate shaft.

2. A string trimmer as claimed in claim 1, wherein the axis of the pivot is substantially perpendicular to an axis of rotation of the cutting head when the cutting head is in a flat cutting position.

3. A string trimmer as claimed in claim 1, wherein the axis of pivot of the barrier is substantially perpendicular to the axis of rotation of the cutting head when the cutting head is in a vertical edge cutting position.

4. A string trimmer as claimed in claim 1, wherein the barrier is capable of pivoting through at least 270°.

5. A string trimmer as claimed in claim 1, wherein the barrier has suitable dimensions so that it is capable of surrounding an edge of the path swept out by the cutting member when it is rotating.

6. A string trimmer as claimed in claim 1, wherein the barrier is capable of pivoting to a position wherein it projects forward of the string trimmer.

7. A string trimmer as claimed in claim 1, wherein the barrier is capable of pivoting to a position where it projects downwardly from the string trimmer.

8. A string trimmer as claimed in claim 1, wherein the barrier is capable of pivoting to a positioning in which it projects rearward from the string trimmer.

9. A string trimmer as claimed in claim 1, wherein there is further provided a guard, the barrier being capable of pivoting to a position where it surrounds a rear of the guard.

10. A string trimmer as claimed in claim 9, wherein the barrier is pivotally mounted on the guard.

11. A string trimmer as claimed in claim 1, wherein there is further provided a guard, the barrier being capable of pivoting to a position where the guard surrounds at least part or all of the barrier.

12. A string trimmer as claimed in claim 1, wherein the barrier includes opposite end portions adjacent a pair of pivot ends and is pivotally mounted on the string trimmer at its said opposite end portions by pivot mechanisms.

13. A string trimmer as claimed in claim 1, wherein the barrier can be latched in a plurality of predetermined angular positions.

14. A string trimmer as claimed in claim 13, wherein the barrier can be latched in six predetermined angular positions.

15. A string trimmer as claimed in claim 1, wherein the barrier is in the form of a band which is pivotally mounted at each of its ends.

16. A string trimmer as claimed in claim 15, where the band curves from one pivot point around to the other pivot point.

17. A string trimmer, comprising:
    an elongate shaft;
    a cutting head rotatably mounted on one end of the elongate shaft;
    at least one cutting member which extends from the cutting head;
    a barrier formable as a band having a first edge and a second edge defining an arc, and a distally separatable pair of pivotable ends, the barrier being used by an operator to move vegetation away from a path swept out by the cutting member when it rotates;
    the barrier being pivotally mounted on said string trimmer about a single axis in a manner where it can pivot from a first position above a path swept out by the cutting member to a position where it is below a path swept out by the cutting member without passing through the path swept out by the cutting member when the cutting head is rotating in a flat cutting position.

18. The string trimmer as claimed in claim 17, wherein the barrier is pivotally mounted on a guard of the string trimmer.

19. The string trimmer as claimed in claim 17, wherein the barrier is mounted on the string trimmer.

20. The string trimmer as claimed in claim 17, wherein the barrier is mounted on the string trimmer in such a manner that it can be latched in a plurality of angular positions in relation to the string trimmer.

21. The string trimmer as claimed in claim 17, wherein the barrier is pivotally mounted at each of its ends to a guard of the string trimmer.

22. The string trimmer as claimed in claim 21, wherein the band is pivotally coupled at first and second pivot points and wherein the band curves from the first pivot point to the second pivot point.

23. A string trimmer comprising:
    an elongate shaft;
    a cutting head rotatably mounted on one end of the elongate shaft;

at least one cutting member which extends from the cutting head;

a guard supportable adjacent to the cutting head, the guard surrounding at least a portion of a path swept out by the cutting member; and a barrier which is capable of being used by an operator to move vegetation away from the path swept out by the cutting member when it rotates, the barrier being pivotally mounted to the guard about a single pivot axis through the guard.

24. The string trimmer of claim 23, wherein the guard is capable of pivoting from a position above the path swept out by the cutting member to a position below the path swept out by the cutting member without passing through the path swept out by the cutting member.

25. The string trimmer of claim 23, wherein the guard comprises a pair of distally separable pivot ends, each of the pivot ends supportable about the single pivot axis.

* * * * *

UNITED STATES PATENT AND TRADEMARK OFFICE
CERTIFICATE OF CORRECTION

PATENT NO. : 6,842,985 B2  Page 1 of 1
DATED : January 18, 2005
INVENTOR(S) : Richardson et al.

It is certified that error appears in the above-identified patent and that said Letters Patent is hereby corrected as shown below:

Column 10,
Line 51, after "is" insert -- pivotally -- and after "trimmer" insert -- at each of its ends --.

Signed and Sealed this

Eighth Day of November, 2005

JON W. DUDAS
*Director of the United States Patent and Trademark Office*